United States Patent [19]
Priddy et al.

[11] Patent Number: 5,577,246
[45] Date of Patent: Nov. 19, 1996

[54] DATABASE MEMORY COMPACTION AND RECLAMATION METHOD

[75] Inventors: Charles A. Priddy; Eric D. Scott, both of Naperville, Ill.

[73] Assignee: Lucent Technologies Inc., Murray Hill, N.J.

[21] Appl. No.: 394,662

[22] Filed: Feb. 22, 1995

Related U.S. Application Data

[63] Continuation of Ser. No. 951,079, Sep. 25, 1992, abandoned.

[51] Int. Cl.$^6$ .............................. G06F 12/00; G06F 13/00
[52] U.S. Cl. ..................... 395/618; 395/444; 395/456; 395/497.04; 364/DIG. 1; 364/282.1; 364/281.1; 364/283.2; 364/246.3
[58] Field of Search ........................ 395/600, 480, 395/444, 456, 497.04; 364/DIG. 1

[56] References Cited

U.S. PATENT DOCUMENTS

| | | | |
|---|---|---|---|
| 4,660,130 | 4/1987 | Bartley et al. | 364/200 |
| 4,775,932 | 10/1988 | Oxley | 395/600 |
| 4,797,810 | 1/1989 | McEntee | 395/425 |
| 4,807,120 | 2/1989 | Courts | 395/425 |
| 4,853,842 | 8/1989 | Thatte | 395/425 |
| 4,989,134 | 1/1991 | Shaw | 395/425 |
| 5,025,367 | 6/1991 | Gurd et al. | 364/200 |
| 5,088,036 | 2/1992 | Ellis et al. | 395/425 |
| 5,136,706 | 8/1992 | Courts | 395/600 |
| 5,218,698 | 6/1993 | Mandl | 345/650 |
| 5,261,088 | 11/1993 | Baird | 395/600 |
| 5,293,614 | 3/1994 | Ferguson et al. | 395/600 |
| 5,321,834 | 6/1994 | Weiser et al. | 395/600 |
| 5,392,432 | 2/1995 | Engelstad et al. | 395/700 |
| 5,404,511 | 4/1995 | Notariami | 395/600 |
| 5,485,613 | 1/1996 | Engelstad et al. | 395/650 |

OTHER PUBLICATIONS

Horowitz et al., Fundamentals of Data Structures, Computer Science Press, pp. 169–182 1983.
Lieberman et al., A real–Time garbage collector based on the lifetime of objects, Communications of the ACM, vol. 26, No. 6, pp. 419–429 1983.
Corporaall, Real realtime performance of heapmanagement systems, using incremental copying collectors, IEEE pp. 344–352 1991.
Corporaal et al., The design space of gargabe Collection, IEEE, pp. 423–428 1991.
Courts, Improving locality of Reference in a garbage–collecting memory management system, Communications of the ACM, vol. 31, No. 9, pp. 1128–1137 1988.

Primary Examiner—Thomas G. Black
Assistant Examiner—Jean R. Homere
Attorney, Agent, or Firm—Michael B. Johannesen

[57] ABSTRACT

A method for maintaining the performance of the system while identifying and reclaiming unreferenced tuples. A set of status bits is associated with each tuple, which are used to indicate the current state of the tuple, and whether it is in a transient state while the garbage collector, according to this invention, is examining it, thus permitting the garbage collector to run without locking out other processing. Further, the garbage collector uses the status bits to audit linked lists used by a database manager against linkage failure. Finally, the garbage collector compresses data and removes redundant data found while traversing the tuple structure of the database.

6 Claims, 9 Drawing Sheets

310

| LIST #1 | |
|---|---|
| CODE 1 | GENERATED KEY 2 |
| CODE 2 | GENERATED KEY 4 |
| ⋮ | |
| CODE 29 | GENERATED KEY 3 |
| CODE 30 | GENERATED KEY 3 |

320

| LIST #2 | |
|---|---|
| CODE 1 | GENERATED KEY 5 |
| CODE 2 | GENERATED KEY 0 |
| CODE 3 | GENERATED KEY 2 |
| ⋮ | |
| CODE 29 | GENERATED KEY 1 |
| CODE 30 | GENERATED KEY 7 |

DATABASE MEMORY COMPACTION AND RECLAMATION METHOD

This application is a continuation of application Ser. No. 07/951,079, filed Sep. 25, 1992, now abandoned.

CROSS-REFERENCE TO RELATED APPLICATION

This application is related to U.S. Patent application entitled "Shared Tuple Database Storage Method" of R. T. Emery, C. A. Priddy and E. D. Scott, and to U.S. patent application entitled "Method for Storing and Retrieving Data" of L. H. Mammel, Jr., filed concurrently with this application.

TECHNICAL FIELD

This invention relates to the field of databases, and more specifically to a database storage method wherein a garbage collection process compacts data and frees unreferenced memory locations.

BACKGROUND OF THE INVENTION

In continuously operating, real-time systems, deallocation of system resources is an area where minor errors have major consequences. If errors occur in resource deallocation, or the system gets into an unusual state, resources are lost to processing and to the users of the system. Lost resources can cause delays, and in some cases, lead to system performance degradation or failure. Under current practice, the system programmer must carefully and thoroughly design and implement deallocation of memory resources.

This is a particularly critical problem in telephone switching systems databases, where access, allocation and deallocation of data base records occurs for each telephone call. Memory resources are used for each database record (herein "tuple") allocation. For purposes of this patent application, a "relation" is the definition of a record and a "tuple" is an instance of a relation. In other terms, a "relation" is a table and a "tuple" is a row of the table. Tuples must be recovered, otherwise memory resources will quickly become exhausted because the memory appears to the system to be full. Each program that recovers tuples therefore must allocate and deallocate these resources properly and carefully.

Programming practices that are used to recover resources carefully are complex and prior art solution to this problem are inadequate. In procedural program-controlled systems, audits are used to recover lost resources. Audits, however, are themselves complex to design and to implement properly, and require a substantial amount of system real-time to carry out their function. Further, audits have not yet been designed that can effectively handle all possible situations that may be encountered in continuously operating system. Initialization of part of all of the system is the only alternative in some cases, which can have severe impact on a switching system or other systems requiting long-term reliability.

Several program-controlled systems utilize a form of automatic storage management called "garbage collection," to recover memory resources. Generically, garbage collectors identify unreferenced data and return resources associated with identified unreferenced data to a pool of available resources. Most garbage collectors also include a form of memory compaction, which moves referenced data to substantially contiguous memory locations. A problem in the art is that most garbage collectors stop all other activity of the programming system for a significant, unpredictable duration of time, while the garbage collector is running, which makes them unsuitable for systems with real-time constraints.

A common garbage collector that stops all other activity while it is running is the mark/sweep garbage collector. In mark/sweep garbage collectors, the "mark" phase uses a set of root tuples as a basis for a recursive traversal of the graph of tuples referenced directly or indirectly by the root tuples, marking all tuples reachable from the root set. In the "sweep" phase, all tuples are sequentially examined. Tuples that are not marked are deleted and tuples that are marked are unmarked and saved. Obviously, the time required for the mark/sweep garbage collector to complete its task is at least proportional to the size of the system. For systems with real-time constraints, the uncontrolled time delay while the garbage collector runs is unacceptable.

A problem in the art, therefore, is that most garbage collectors are real-time intensive in that they block other processing from running while searching for unreferenced tuples and compressing data space.

SUMMARY OF THE INVENTION

This problem is solved and a technical advance is achieved in the art by a method for maintaining the performance of the system while identifying and reclaiming unreferenced tuples. A set of status bits is associated with each tuple, which are used to indicate the current state of the tuple, and whether it is in a transient state while the garbage collector is examining it, thus permitting the garbage collector to run without locking out other processing. Further, the garbage collector uses the status bits to audit linked lists used by the database manager as described in U.S. patent application of R. T. Emery, C. A. Priddy, and E. D. Scott, against linkage failure. Finally, the garbage collector of the present invention compresses data and removes redundant data found while traversing the tuple structure of the database.

BRIEF DESCRIPTION OF THE DRAWINGS

FIG. 9 is a block diagram of parent tuples of FIG. 3 after the second phase of garbage collection according to the exemplary embodiment of this invention;

DETAILED DESCRIPTION

Figure 1:
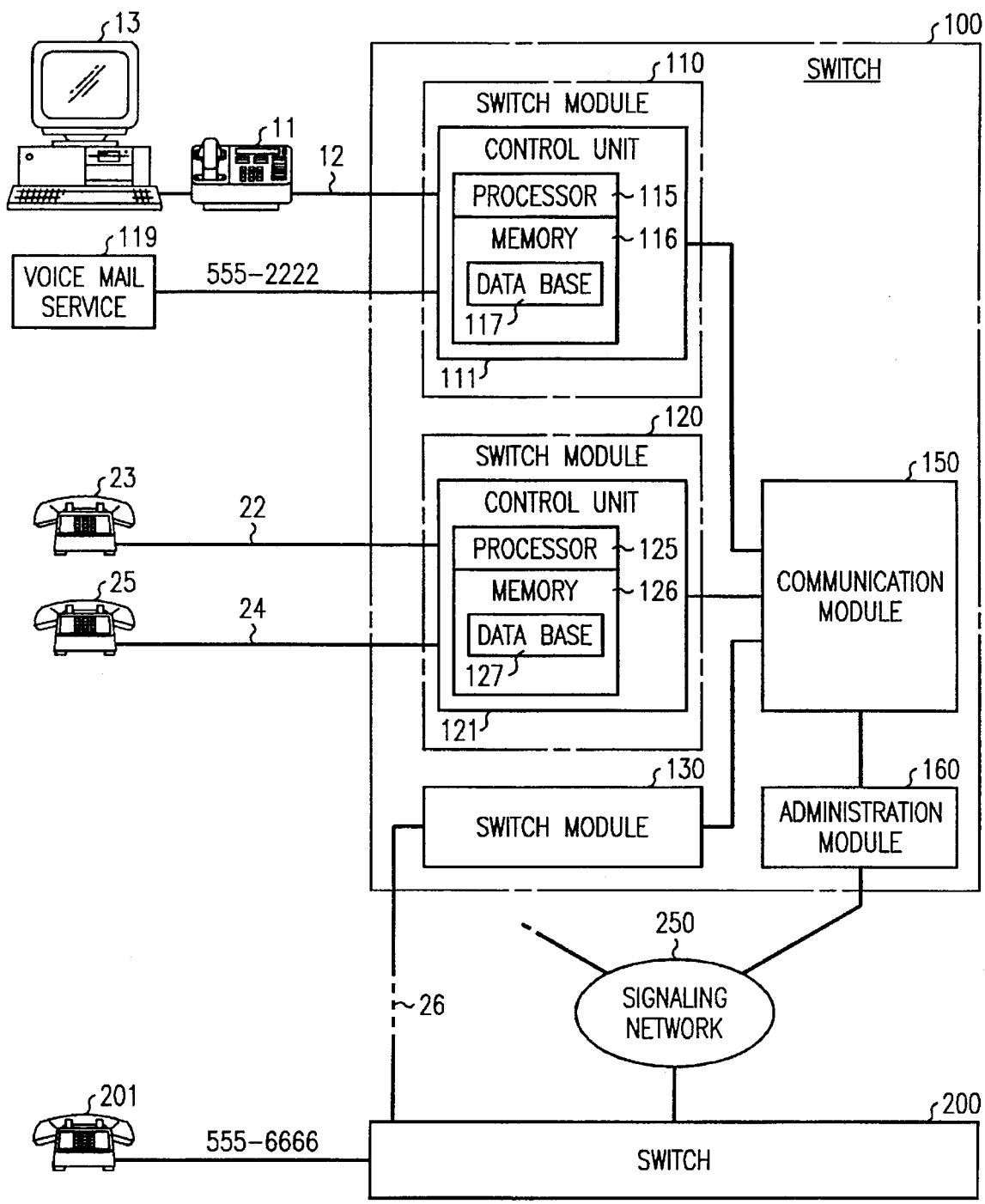
FIG. 1 is a block diagram of a switching network configuration including an exemplary embodiment of this invention.

This invention will be described in connection with a telephone switching system as illustrated in FIG. 1, but the application of this system is much broader. For example, a database according to this invention may be used in a general purpose program-controlled computer.

An exemplary method for storage of data in a shared tuple database is described herein in the context of a telephone switching network configuration of FIG. 1, having two central office switches, 100 and 200, an inter-switch signaling network 250, e.g., a common channel signaling (CCS7) network and illustrative communications stations, including conventional analog telephone station sets 23, 25, and 201, an integrated services digital network (ISDN) telephone station set 11, and data terminal 13. Switches 100 and 200 are interconnected by a communication path 26, which may include intermediate switches.

Illustratively, switch 100 is a distributed control, ISDN electronic telephone switching system such as the system disclosed in U.S. Pat. No. 4,592,048, issued to M. W. Beckner, et al., on May 27, 1986. Alternatively, switch 100 may be a distributed control, analog or digital switch, such as a 5ESS® switch manufactured by AT&T and described in the AT&T Technical Journal, v.64, No. 6, July/August, 1985, pp 1303–1564.

An integrated services digital network (ISDN) is a network that provides end-to-end connectivity to support a wide range of services, including voice and non-voice services, to which users have access by a set of standard multipurpose customer interfaces. Switch 100 includes a number of switching modules (SMs 110, 120, 130), each associated with a different set of telephone station sets or trunks. Each switching module includes a control unit for controlling connections to and from its associated telephone station set or trunks. Switching module 110, for example, includes control unit 111 for controlling connections to and from telephone station set 11. Switching module 120 includes control unit 121 for controlling connections to and from telephone station set 23.

Each control unit 111, 121 comprises a processor 115, 125 and memory 116, 126, respectively. Each memory 116, 126 includes a database 117, 127 wherein processors 115, 125 store configuration and operational data, as is known in the art. For example, speed call lists associated with telephone station set 11 is stored in database 117, and speed call lists associated with telephone station sets 24 and 25 are stored in database 127.

The architecture of switch 100 includes communication module (CM) 150 as a hub with switching modules 100, 120, and 130, and an administrative module (AM) 160 emanating therefrom. Switching module 110 terminates digital subscriber lines, e.g., 12, and voice mail service 119, which provides storage and retrieval of audio messages, as is known in the art. Voice mail service 119, comprises, in the preferred embodiment, an AUDIX® system as manufactured by AT&T.

Switching module 120 terminates conventional analog lines (i.e., tip-ring pairs), 22, 24, and provides circuit-switched connections to and from the associated telephone station sets 23, 25. Switching module 130 is similar to switching modules 110 and 120, but includes the appropriate analog or digital trunk unit (not shown) for interfacing with the outgoing trunks included in communication path 26 to switch 200.

To complete the description of switch 100, communications module 150 acts as a switch fabric for communication among switch modules and the administrative module (AM) 160. Administration module (AM) 160 provides coordination of the functional components of switch 100 and human-machine interface. Switch 200 is shown connected to a conventional analog telephone station set 201, for purposes of illustration. The architecture of switch 200 and the types of telephone station sets served by switch 200 are not important to the present invention and are thus not described further.

A shared tuple database according to the preferred embodiment of this invention may be implemented in switch 100 of FIG. 1, as database 127, for example. For purposes of this description, an implementation of speed calling lists in the databases of SM 120 and control unit 121 will be described, since that is an area that clearly illustrates the utility of this invention. This invention is not, however, limited to SM data bases or speed calling lists, or to switching systems.

For purposes of this illustration, telephones 23 and 25 have, as one of their features, speed calling. Speed calling provides the user with the ability to enter a one or two digit code which the switch translates into a number string and uses depending on the state of the call. The number string may be up to 32 digits in length and may include directory numbers, account numbers, access numbers, etc. for both domestic and international calling. The primary use of this feature is placing telephone calls. The user enters the one or two digit code after receiving dialtone and the switch completes the call using the retrieved number string as the directory number of the destination telephone.

For example, telephone 23 goes off-hook, receives dialtone, and a code, such as the digit 1, is entered. Control unit 121 recognizes the code and sends a query to database 127 in order to retrieve the number string that is associated with the code number and the calling telephone. Database 127 responds with, for example, the directory number of telephone 201, "5556666". Control unit 121 uses "5556666" from database 127 in order to complete the call to telephone 201. In a specific example, telephones 23 and 25 subscribe to speed calling and to voice mail service 119. Advantageously, telephones 23 and 25 would generally have a speed calling code assigned to access messages in voice mail service 119 (directory number "5552222", for example).

Figure 2:
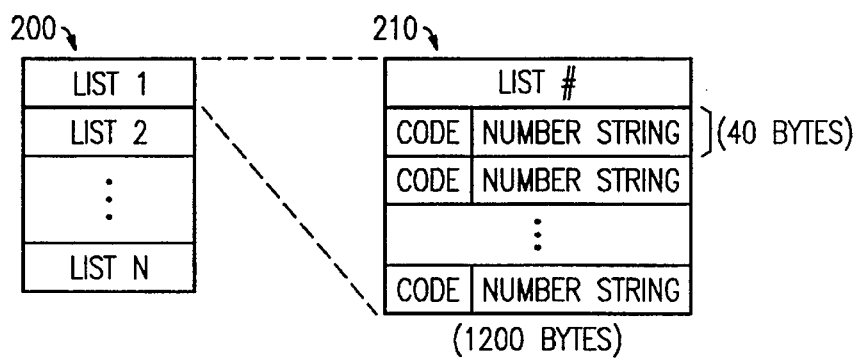
FIG. 2 is a block diagram of a prior art data base layout, as may be found in switching systems such as FIG. 1.

FIG. 2 shows a data structure for a prior an speed calling database relation. In the prior art, the database stores a plurality of structurally identical speed calling lists 200. Each individual speed calling list 210 has a list number that corresponds to the subscribing telephone. For every possible speed calling code, a memory location is assigned comprising space for the maximum number of permissible digits for the digits needed to effect speed calling entry (in this example, 32) corresponding to the code. Each entry in the list requires 40 bytes; each list may be 30 entries; therefore each list requires 1200 bytes. A list is preallocated for each telephone subscribing to speed calling because systems cannot allocate or deallocate database memory locations fast enough for potential changes of entries.

According to statistical analysis of databases of operating telephone switching systems, most speed calling subscribers only use one or two numbers in a speed calling list. The rest of the entries are not used. Additionally, there may be redundant entries across speed calling lists. For example, the directory number of voice mail service 119 in the speed calling list of telephone 23 and the speed calling list of telephone 25. A further example of redundant entries is community emergency service numbers in a residential community. Thus, the prior art shows that there is much redundant data and empty space in the database associated with a primary relation, such as a speed calling list.

Prior art speed calling lists cannot be made into "view" relations, as discussed above, because there is only partial commonality among the data stored in speed calling relations. Furthermore, it is impermissible to have one deletion which affects other speed calling lists. Therefore, a new system is required in order to take advantage of the amount of redundant data in a typical database while permitting updates that do not affect tuples in other relations, or other tuples in the same relation.

Figure 3:
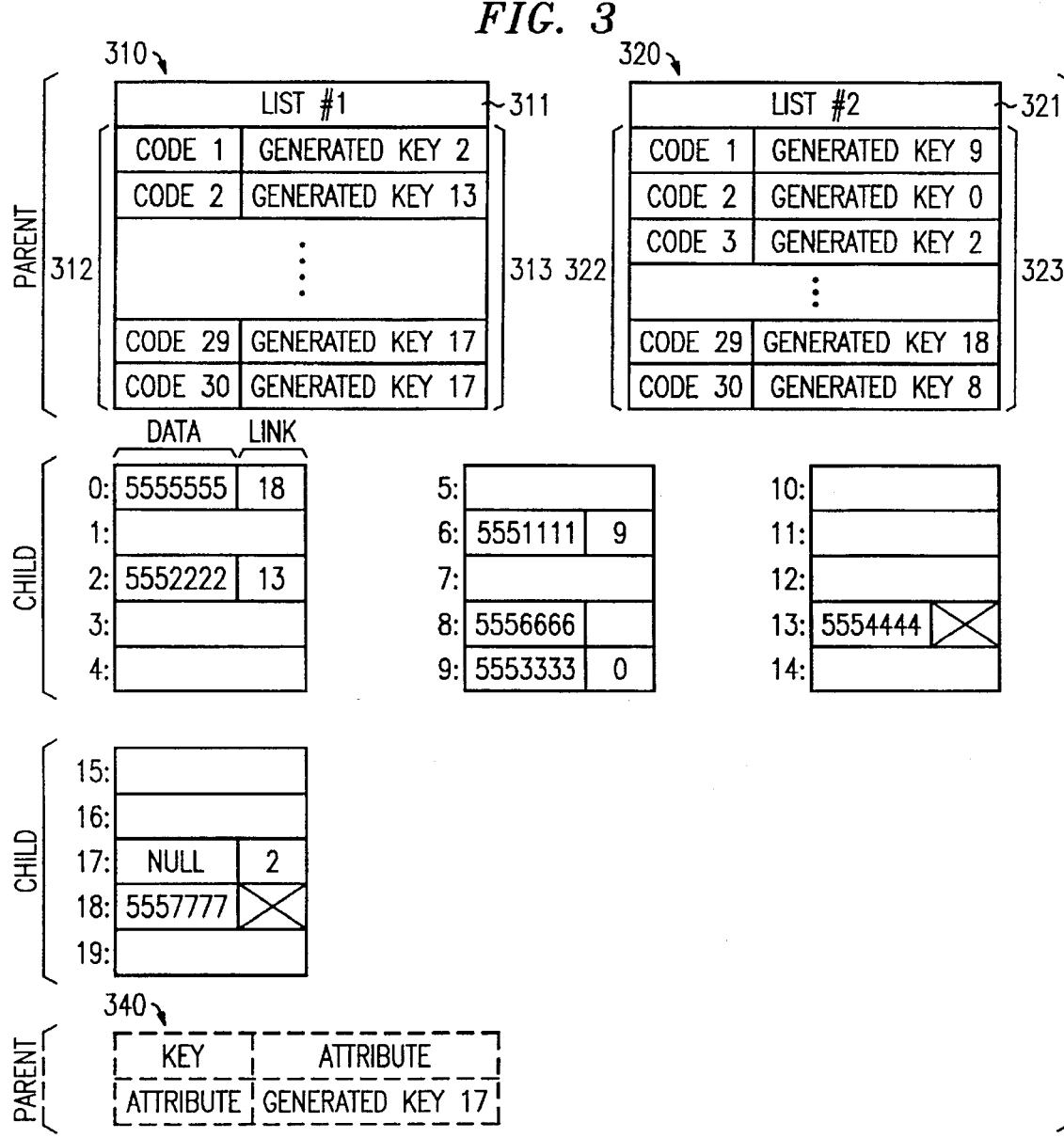
FIG. 3 is a block diagram illustrating the logical structure of a database layout according to the exemplary embodiment of this invention, in the context of a speed call list from FIG. 1.

FIG. 3 shows a logical block diagram of a speed calling relation according to an exemplary embodiment of this invention. Each telephone in the above example, 23 and 25, has a root or "parent" speed calling tuple, 310 and 320, respectively, related to the directory number of the telephone. Each root tuple contains a primary key 311, and 321, which corresponds to a telephone, a list of codes 312, and 322 (the speed calling code digits, as in the prior art), and a plurality of generated keys 313, and 323, corresponding to the codes on a one-to-one basis. Each generated key is an index into a data page containing a child tuple. Since speed calling number strings may be up to 32 digits, parent/child tuples may store only a few digits and also include a generated key to further tuples (not shown for clarity) for further digits as part of the data field. Parent/child tuples may also include a plurality of generated keys. Each child tuple comprises a data block containing a number string and a link (explained below in connection with FIG. 4).

In this example, list 310 associated with telephone 23 includes a generated key of child tuple 2 as being one of the speed calling numbers. List 320 associated with telephone 25 also includes the generated key of to tuple 2 as being one of the speed calling numbers (this corresponds to the stored data "5552222", the telephone number of the voice mail service). This is the case, for example, if both telephones 23 and 25 have the directory number for voice mail service 119 (FIG. 1 ) on their respective speed calling lists. In this manner, redundant data can be stored once, thus realizing a memory savings.

Similarly, statistical analysis has shown that a very low percentage of speed calling lists actually comprise more than 16 digits (only 7 digits are shown in FIG. 3 for clarity). Therefore, while there are generated keys in child tuples to reference additional digits, almost all reference the same tuple, tuple 17, which contains a Null string, thus garnering an even larger memory savings. Furthermore, parent tuple 340, from an additional, unrelated relation comprising a plurality of attributes, as know in the art, may also reference Null tuple 17. In this manner, all tuples in all relations that include a similar Null string may reference tuple 17, further increasing memory savings.

Figure 4:
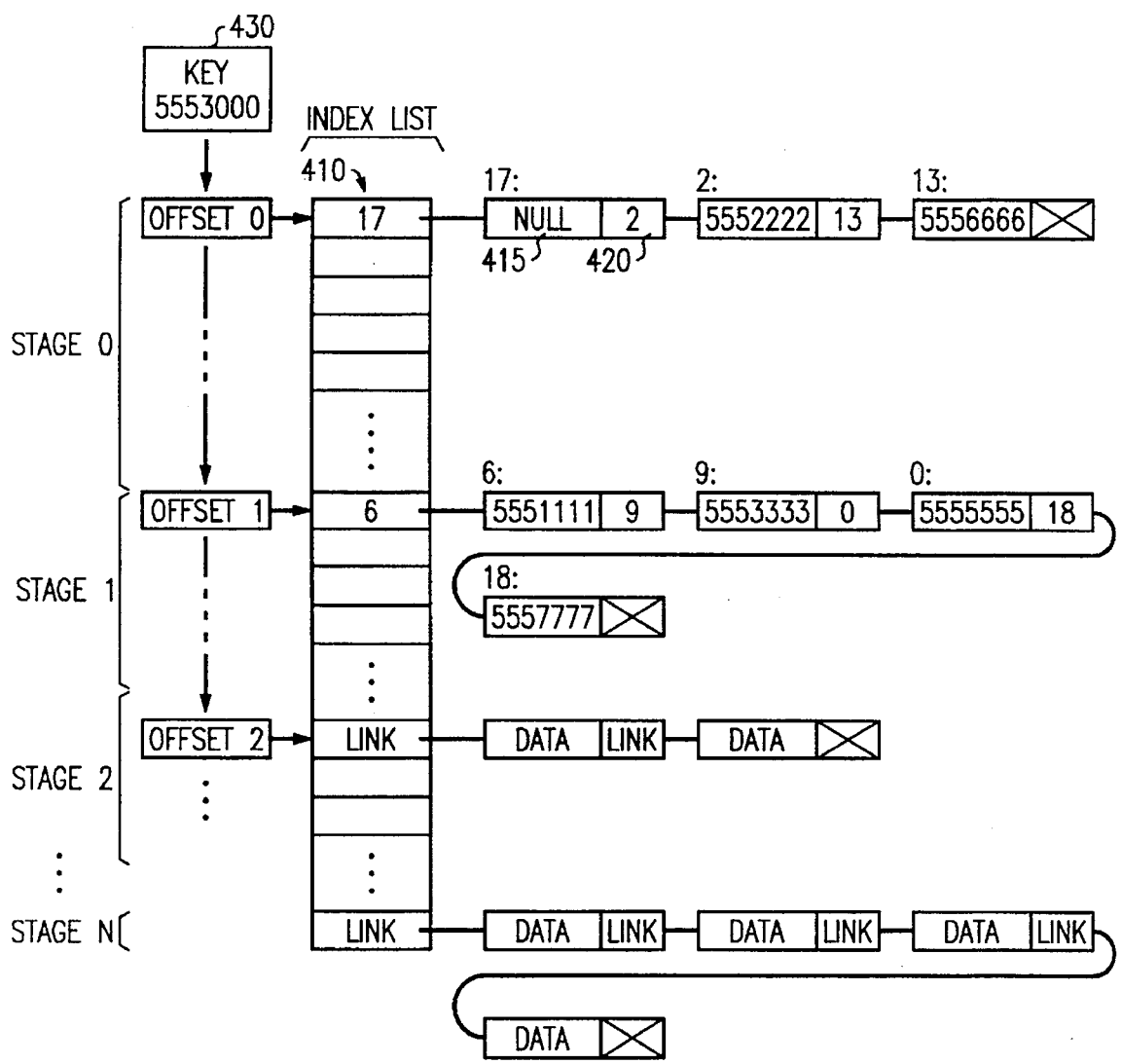
FIG. 4 is a block diagram of the physical structure of a database layout according to the exemplary embodiment of this invention.

FIG. 4 illustrates the physical structure of a database according to the exemplary embodiment of this invention in FIG. 3. The physical structure of this database comprises a plurality of data pages of memory, as known in the art, containing an index list and a plurality of data blocks, or tuples. Index list 410 comprises a plurality of links, each of which point to a singly-linked list of tuples. Each index is a header block that is linked to tuples containing data that hashes to that index. Each tuple includes a data portion 415 and a link 420.

Index list 410 comprises sequential tuples on consecutive data pages, divided into stages. In the preferred embodiment of this invention, there are five stages. Each stage has a smaller number of reverse index tuples than the previous stage; wherein the search and allocate algorithm is based on a "divide and conquer" philosophy.

In order to quickly and efficiently access data in the linked list, the key 430 is "hashed" as is known in the prior art, and the hashed key is applied as "hashval" to equation 1 to derive an offset, h(N), into index list 410, where N is the stage number.

$$h(N) = \sum_{i=0}^{N-1} (\text{tuples in stage } N-1) + \quad [1]$$

(hashval modulo (tuples in stage $N$))

The only requirement for the size of each stage is that the size of each adjacent stage must be mutually prime. If the data is not found in the zeroth stage (stage $N=0$), then "hashval" is applied to equation 1 for stage $N=1$. It is increasingly likely that the desired data will be found as each stage is reached, as it is increasingly unlikely that each key will hash to identical locations within each stage in index list 410. Once an index into index list 410 is determined, the data tuples in the associated linked list are checked.

Each data tuple comprises a control word (not shown for clarity in these drawings), a data section and a link to a next tuple, in a linked list of tuples. The control word comprises a plurality of status bits used to indicate the current state of the tuple. Preferably, there are 10 tuples or less in any linked list, in this exemplary embodiment. Tuples in the linked list contain data items that are stored in ascending order according to their value, for example, the first list includes "NULL", "5552222", "5556666". The second list includes "5551111", "5553333", "5555555", and "5557777".

According to this invention, redundant data is preferably stored only once. Therefore, when a new tuple is added to the database or an existing tuple is changed, the database is searched to determine if the data in the new tuple already exists in the database. If the data is extant, then an index to the tuple containing the data is linked to the parent tuple, and the addition or change is complete. If the data is not found (that is, does not currently exist in the relation), then a new tuple is added to the relation containing the new data, and an index to the new tuple is linked to the added or changed parent tuple.

Insertion of data, according to this invention, uses a novel searching system. The key 430 of the data to be inserted is hashed, as is known in the art. In the preferred embodiment of this invention, the key is the data field. The exact hashing algorithm is not important to this invention, as any appropriate hashing algorithm will work with this invention. Offset 0 is then used as an index into the zeroth stage index list to obtain a pointer to a singly-linked list of tuples. An examination is made of the data content of each tuple, searching for a match with the data to be allocated. If the content is not found in the first tuple, then the link is followed to the next tuple, etc. A comparison is made to determine if the binary value of the data (in this exemplary embodiment the key, such as "5553000" is the entire data content) to be inserted is greater than the binary value of the data in the tuple. If it is greater, then the number of tuples in the linked list is noted (as will be explained below) and the linked list of the next tuple in the index list is searched. If there is a content match between a tuple and the data to be inserted, then a reference to that tuple (that is, the index to both the data page and that tuple) is given to the parent relation. If the data item was not in the first linked list, then optionally a search may be made of the next index tuple after the hashed-to index, following the chain of tuples as above. If the data item is still not found, a further index list may be checked.

Next, if the data item is not found in the zeroth stage, the hashed key is again applied to equation 1 for stage 1. Offset 1 is then applied to the first stage index list, and the link list of tuples is again followed, as above. Each subsequent stage provides a search reduction technique to search through the set of all tuples that overflowed the previous stage. This mechanism provides a very high memory utilization (high data density in memory) with reduced search and reduced algorithmic complexity.

If the data item is not found in the first stage, then offset 2 is calculated and used as an index into a second stage. The tuples are then searched for a match on the data content, as above. This searching algorithm may take place for several levels. In the preferred embodiment there are 5 stages. In stage N, there is an overflow list of singly-linked tuples, which is not restricted to any number of tuples; the lists may be any length. If the data is found, then a reference (generated key) to the data item is returned to the parent relation.

If the data is not found, then a new tuple is allocated for the data. The location of the new tuple is chosen by finding either the lowest value free (unused) generated key tuple in the relation regardless of the data content to be stored in that tuple. The newly allocated tuple is then linked into one of the linked lists. To this end, the list chosen is determined during the first search (that determined the nonexistence of the data). While the system is searching for the data content, the first list with less than the target length (10 in the exemplary embodiment) is stored, along with the data tuple location that is less than the tuple being searched-for, and whose link references either a tuple with data greater than the searched-for data or the list termination value. Once the non-existence of the data content is determined, a quick search is made starting at the stored data location to accommodate concurrent inserts. When the proper location within the selected list is found, the tuple is linked into that location. In this example, the data "5553000" may be linked between tuple number 6 ("5551111") and tuple number 9 ("5551111").

Virtual tuple operations (insert, update, delete) only create a new, sharable tuple, reference an existing shared tuple, and/or remove a single reference to a shared tuple. At no time can these operations directly delete a shared tuple; deletions only delete root tuples and their references to shared tuples. A shared tuple can only be deallocated once all references to that tuple have been removed; otherwise anomalous modifications can result. Each operation does not know at any one time all references to a particular tuple.

Further, highly concurrent operations are permitted to take place on the same relation and there is a possibility that any one operation may be abnormally terminated before the operation is completed. Therefore, a further procedure separate from insert/delete/update is needed to ensure that unreferenced tuples are returned to the pool of available tuples.

A garbage collector according to this invention, never blocks or locks out operations or queues one operation behind other operations. This garbage collector provides a reliable, verifiable technique for determining the existence or non-existence of one or more references to each shared tuple and only deallocates a tuple once it is guaranteed to have zero references to it. Additionally, because the number of tuples being used can periodically grow and shrink, greater memory utilization is achieved by compressing the data tuples into as few data pages as are possible. The same compression should also find and free tuples containing redundant data that may exist.

Figures 5, 6:
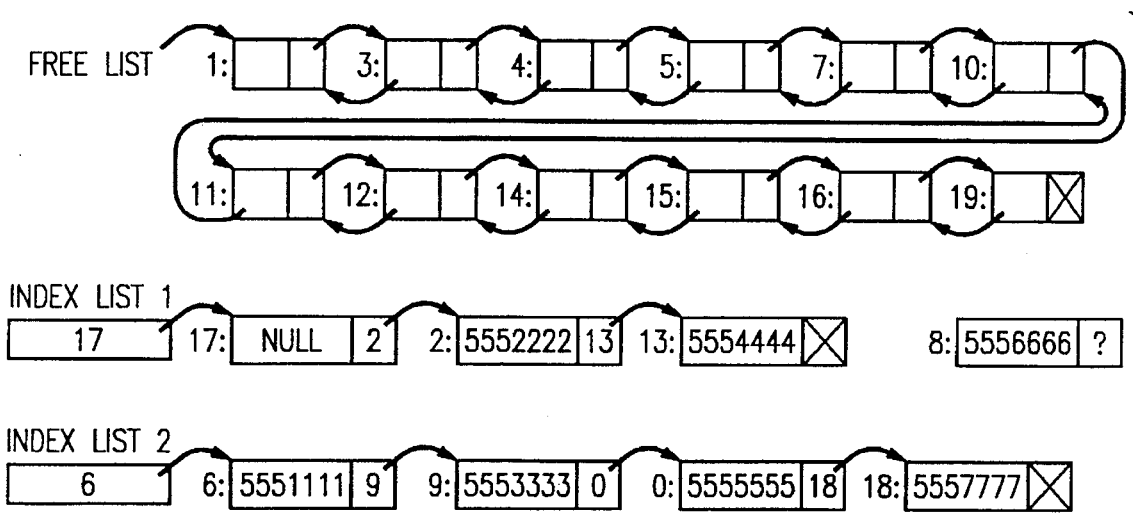
FIG. 5 is a block diagram of a memory page layout prior to garbage collection according to one aspect of this invention.
FIG. 6 is a block diagram of the physical structure of the memory page layout of FIG. 5 prior to garbage collection.

Referring now to FIGS. 5–15. A garbage collection routine for compressing fragmented data pages and collecting lost tuples is shown. In order to meet the above goals, a garbage collector according to this invention runs in five phases:

1. Compression check and switch phase
2. Compression release phase
3. Marking phase
4. Collect phase
5. Orphan collect phase The first phase, compression check and switch, will be described in connection with FIGS. 5–9. FIG. 5 shows a memory page layout for the generated key data pages of the child tuples of FIG. 3, and FIG. 6 shows the physical structure for the free list, two of the index lists, and linked lists of the data values on the data pages of FIG. 5. The free list is a doubly linked list of tuples that are available for insertion and are sorted in ascending order of generated key values.

The first phase of garbage collection, the compression check and switch phase, determines whether a compression is needed. This determines whether a substantial amount of memory would be released by compressing generated key tuples from higher-order memory data pages into lower-order memory data pages. A "compression switch" (shown below in connection with FIGS. 7 and 8) is performed in this phase if it is determined to be worth while.

FIG. 5 illustrates the generated key data pages before the first phase of garbage collection according to this invention. The data pages contain 5 tuples each, numbered sequentially. There are generated key values in generated key data pages in tuples 0, 2, 6, 8, 9, 13, 17, and 18. Tuple 8 is not in any of the link lists due to a linkage failure error.

FIG. 6 shows the structural relations among the tuples of the data pages of FIG. 5. The free list comprises tuples 1, 3, 4, 5, 7, 10, 11, 12, 14, 15, 16, and 19 (which are shown as empty tuples in FIG. 5). A first index link points to tuple 17, (containing "NULL") which points to tuple 2 (containing "5552222"), which points to tuple 13 (containing "5554444"). A second index link points to tuple 6, which points to tuple 9, which points to tuple 0, which points to tuple 18. Tuple 8 is not linked by any of the other tuples, and is therefore an orphan tuple, or unreferenced by a linked list. A tuple, such as tuple 6 may become unreferenced when all generated keys to that child tuple are removed from all parent tuples.

For purposes of this illustration, the savings in data pages is worth the effort of compression because there are enough free tuples to fill up at least one data page. Therefore, a compression switch is performed, switching values from higher numbered data pages to the lower numbered data pages, starting from the end of the relation. Thus, the value "5557777" from tuple 18 is written into unused tuple 1, which is on the free list. The value "NULL" from tuple 17 is written into unused tuple 3, etc., until the first unused tuple has a generated key greater than the next data tuple to be copied to a lower position.

Figures 7, 8:
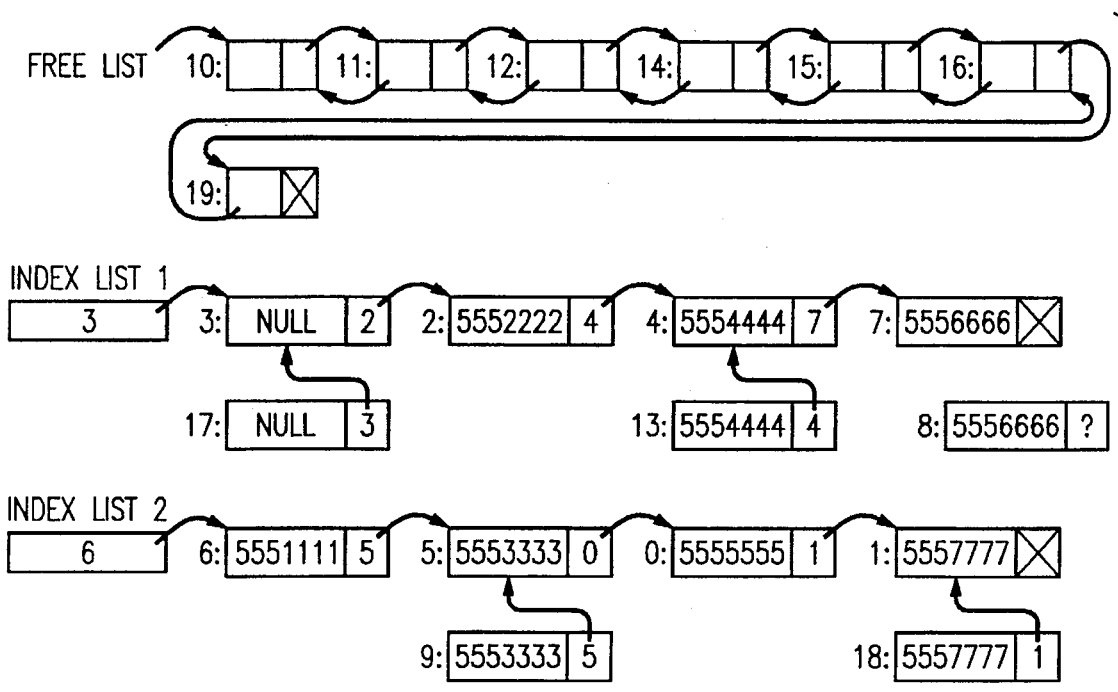
FIG. 7 is a block diagram of a memory page layout after the first phase of garbage collection according to the exemplary embodiment of this invention.
FIG. 8 is a block diagram of the physical structure of the memory page layout of FIG. 7.

FIG. 7 illustrates the generated key data pages after phase 1 has completed wherein the compression switch was performed. FIG. 8 shows the free list and the index list after the compression switch of phase 1. The free list is shorter because the unused tuples on lower numbered data pages are used to copy data from higher memory locations to lower locations. The index lists have been altered so that the lower physical memory data item is in the index list in place of the higher physical memory item that it was copied from, and the higher physical memory item points to the lower valued data item. In this manner, all new references to the data will find and be set to the lower physical memory data, but all relations that reference the higher memory data may still use the data. Tuples 17, 13, 9, and 18 are considered "orphaned" because they can no longer be referenced by new tuples in other relations.

The second phase of garbage collection, the compression release phase, finds all parent relations that reference orphan tuples and resets all parent relations to point to the new, lower memory tuples with the same data. Turning now to FIG. 9, all virtual relations using this generated key relation are read and updated with the exact same content as is read. Since the update finds the lower valued generated key location of the data being updated, the parent tuple's reference is reset to the lower generated key location automatically. Returning briefly to FIG. 3, FIG. 3 shows parent tuple 310 containing references to tuples 2, 13, 17, and 17 parent tuple 320 containing references to tuples 9, 0, 2, 18, and 8 before the second phase runs. In FIG. 9, parent tuple 310 has references to tuples 2 (unchanged because it was not switched), 4, 3, and 3, and parent tuple 320 has references to tuples 5, 0 (unchanged), 2 (unchanged), 1, and 7 at the end of this phase.

The third phase, the marking phase, marks every tuple that has a corresponding parent tuple pointing at it. All parent tuples (such as FIG. 9) are sequentially searched and all child tuples' control words are marked. All child tuples on the free list are marked. Additionally, all inserts and updates to the generated key access method mark the control word for the tuple, to prevent collection of tuples allocated concurrently with garbage collection. Only tuples that are not linked to a parent tuple or not on the free list are not marked, such as tuple 6 (FIG. 8).

Figures 10, 11:
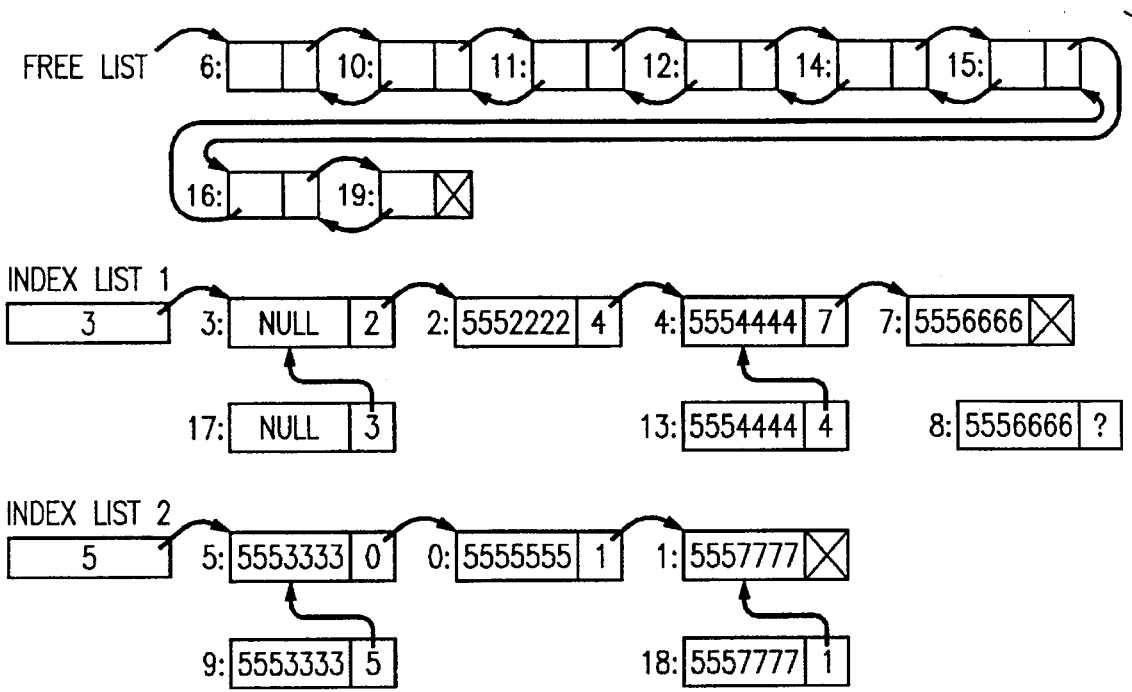
FIG. 10 is a block diagram of a memory page layout after the third phase of garbage collection according to the exemplary embodiment of this invention.
FIG. 11 is a block diagram of the physical structure of the memory page layout of FIG. 10.

The fourth phase, the collection phase, removes all tuples that do not have parent relation tuple references (not marked in the previous phase or by a concurrent insert) from the index lists and places them onto the free list. In addition, every tuple found on the index lists and free list is marked so that the subsequent "orphan" collect phase can find all existing "orphan" tuples. FIG. 10 illustrates that tuple 6 has been collected from the generated key data pages because it did not have parent tuple references to it and thus would not be marked. FIG. 11 illustrates that tuple 6 was placed on the free list and removed from the index list 2, and the links reset so that tuple 5 is the first tuple on index link 2 list.

The fifth, and final, phase, orphan collect phase, collects all of the orphan tuples (identified by the previous phase) that do not appear on any of the index lists, or on the free list.

Figures 12, 13:
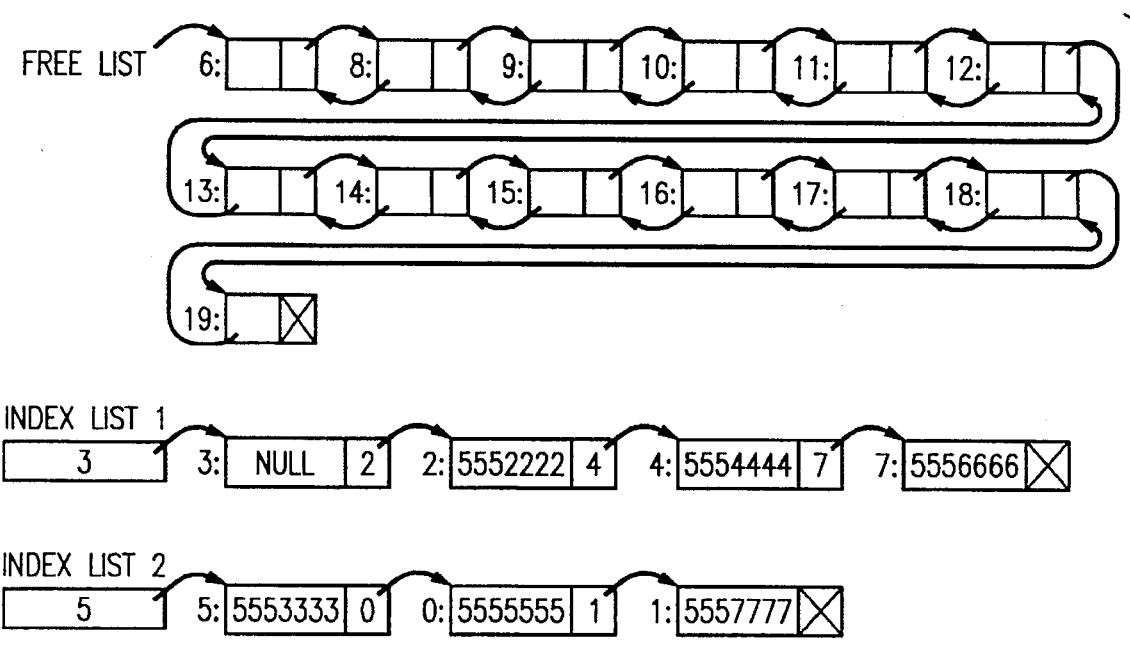
FIG. 12 is a block diagram of a memory page layout after the fifth phase of garbage collection according to the exemplary embodiment of this invention.
FIG. 13 is a block diagram of the physical structure of FIG. 12.

Each orphan tuple is either placed on the free list (if it has no parent tuples), an index list (if it has a parent), or set to point to a tuple on an index list of equal value but whose generated key is of a lower value. FIG. 12 shows that all high memory tuples are now on the free list. FIG. 13 shows the free list and the index lists after the "orphans" (8, 9, 13, 17, and 18) have been collected.

Figures 14, 15:
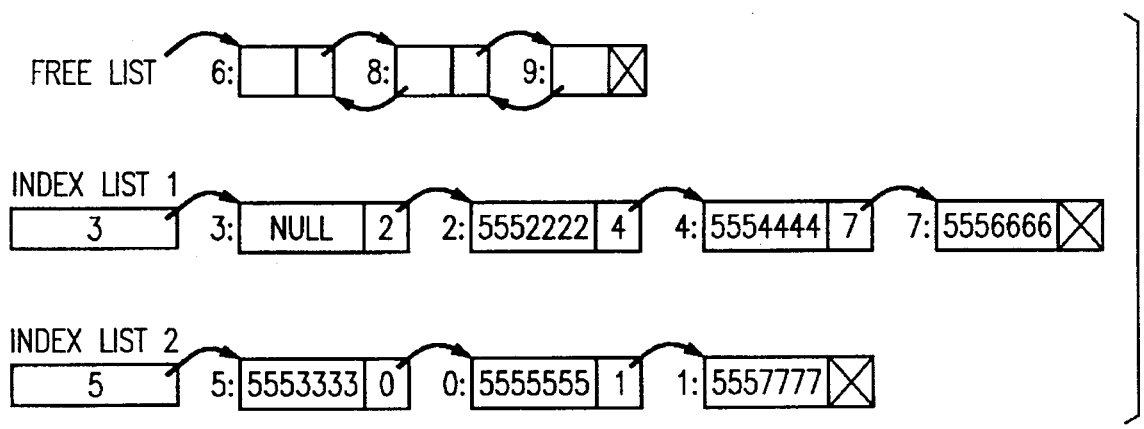
FIG. 14 is a block diagram of the memory page layout after empty memory pages have been deallocated.
FIG. 15 is a block diagram of the physical structure of FIG. 14.

Finally, referring to FIGS. 14 and 15, all generated key data pages which are empty are deallocated. FIG. 14 shows only the active data pages being used by the generated key access method. FIG. 15 shows the tuples that existed on the deallocated pages no longer are on the free list and show the index list logical layout.

It is to be understood that the above-described embodiment is merely an illustrative principle of the invention and that many variations may be devised by those skilled in the art, without departing from the scope of the invention. It is, therefore, intended that such variations be included within the scope of the claims.

We claim:

1. A method for effecting recovery of database memory resources when necessary for use by a digital data processing system for performing real-time operations, said digital data processing system including a limited amount of memory, said memory having a plurality sequentially numbered memory pages, said database comprising a plurality of child tuples and one or more parent tuples, each of said parent tuples having at least one reference to one or more child tuples, said child tuples being stored in sequentially numbered memory locations on said memory pages and each child tuple having the capability of referencing another child tuple, said method comprising:

copying child tuples from higher numbered memory locations to lower numbered memory locations by repetitively copying a child tuple from the highest numbered occupied memory location into the lowest unused memory location until the next lowest unused memory location has a higher number than the highest memory location in which a child tuple is located;

resetting references to said copied child tuples in all tuples referencing said copied child tuples;

marking all child tuples that are referenced from any of said tuples;

collecting all unmarked child tuples, and collecting all copied child tuples from said higher numbered memory locations thereby creating unused higher numbered memory pages.

2. A method in accordance with claim 1 further including the step of deallocating said unused higher numbered memory pages after said step of collecting copied child tuples.

3. A method in accordance with claim 1 wherein said database also includes a free list of unallocated child tuples, and said step of marking said child tuples includes marking said unallocated tuples on said free list.

4. A method for effecting recovery of database memory resources when necessary for use by a digital data processing system for performing real-time operations, said digital data processing system including a limited amount of memory, said memory having a plurality of sequentially numbered memory pages, said database comprising a plurality of child tuples and one or more parent tuples, said parent tuples having at least one reference each to one or more child tuples, said child tuples being stored in sequentially numbered memory locations on said memory pages, each of said child tuples having unique data and a link to another of said child tuples, selected ones of said child tuples being linked into lists, said data base further comprising an index list having a plurality of links to a plurality of linked lists of child tuples, said method comprising:

selecting unused memory locations among said child tuples in lower numbered memory locations;

compressing child tuples from higher numbered memory locations to lower numbered memory locations by copying said child tuples from higher numbered memory locations into said selected unused memory locations;

resetting references of child tuples from said higher numbered memory locations to said lower numbered memory locations, said resetting including linking said lower numbered memory child tuples into the linked list of said higher numbered memory child tuple;

marking all child tuples referenced from said parent tuples;

collecting all unmarked child tuples; and collecting all compressed child tuples from said higher numbered memory locations.

5. A method in accordance with claim 4 wherein said step of compressing comprises the substeps of:

a. locating free tuples in lower numbered memory pages; and b. copying tuples from the highest numbered occupied memory location to said located free tuples in lower numbered memory pages.

6. A method in accordance with claim 5 further comprising:

performing substeps a and b until one of said located free tuples has an address higher than one of said tuples to be copied from said higher numbered memory locations.

* * * * *